Jan. 23, 1968  R. W. STORMFELTZ  3,365,041
CLUTCH FACING
Filed Oct. 21, 1965

INVENTOR:
ROBERT W. STORMFELTZ
BY Howson & Howson
ATTYS.

United States Patent Office 3,365,041
Patented Jan. 23, 1968

3,365,041
CLUTCH FACING
Robert W. Stormfeltz, Manheim, Pa., assignor to Raybestos-Manhattan, Inc., Manheim, Pa., a corporation of New Jersey
Filed Oct. 21, 1965, Ser. No. 499,652
10 Claims. (Cl. 192—107)

ABSTRACT OF THE DISCLOSURE

An annular clutch friction lining comprising a friction element and a reinforcing element bonded together and each formed from a spirally wound strip. The friction element includes fabric impregnated with rubber, resin and friction filler. The reinforcing element includes porous, condensed, spinning grade asbestos fiber web material reinforced by open mesh woven glass fabric, and impregnated with a resin. The elements are compressed and bonded together to consolidate their convolutions and the heat treated to harden the resin.

This invention relates to clutch facings of novel structure, and more particularly to clutch facings of composite structure or to reinforcement of endless friction facings generally formed of a strip of material wound in spiral fashion to form a coiled annulus.

It has heretofore been proposed to strengthen clutch facings of the class described against disruption by centrifugal force by bonding to one face a coextensive metal sheet or fibrous backing layer or sheet formed of felted or woven material. A particular disadvantage of such use of a metal sheet is high inertia, requiring greater power to rotate the clutch assembly. Other disadvantages of a metal reinforcing sheet are the difficulty of obtaining a substantially flat sheet which will meet clutch assembly dimensional tolerances, and increased costs. Although clutch facings reinforced by a fibrous backing layer or sheet, as disclosed for example in United States Patent No. 2,640,-795, are relatively inexpensive to produce, and have increased bursting strength, nevertheless, the increase in bursting strength provided by the backing layer may not be sufficient to cope with the very high rotative speeds clutch facings are subjected to in today's motor vehicles.

It is an object of this invention to provide novel reinforced clutch facings of the class described which can be produced relatively inexpensively, yet have the substantially increased bursting strength required of today's motor vehicles. The novel clutch facings according to this invention comprise an annular body formed of a friction element comprising a spirally wound fibrous fabric strip impregnated with a cement composition comprising rubber, heat-hardenable resin and friction material filler, and a reinforcing element coextensive with a face of said friction element and comprising a spirally wound strip of thin, flexible, consolidated and condensed dry carded spinning grade asbestos fiber web material of relatively high porosity, the fibers being interlocked with each other, and said strip comprising said reinforcing element being impregnated with a cement composition compatible with the cement composition of said friction element and comprising heat-hardenable resin, said elements being compressed to bond said elements together and to consolidate the convolutions of the respective elements upon each other and heat-treated to harden said cement compositions.

Preferably, the friction element comprises a spirally wound strip of woven fabric comprising asbestos fibers having metallic wires associated with at least some of the strands of the fabric, and the asbestos fiber web material comprising the reinforcing element is reinforced by an open mesh woven glass fabric.

Other objects and advantages of this invention will be apparent from the accompanying drawings and following detailed description.

Figure 1:
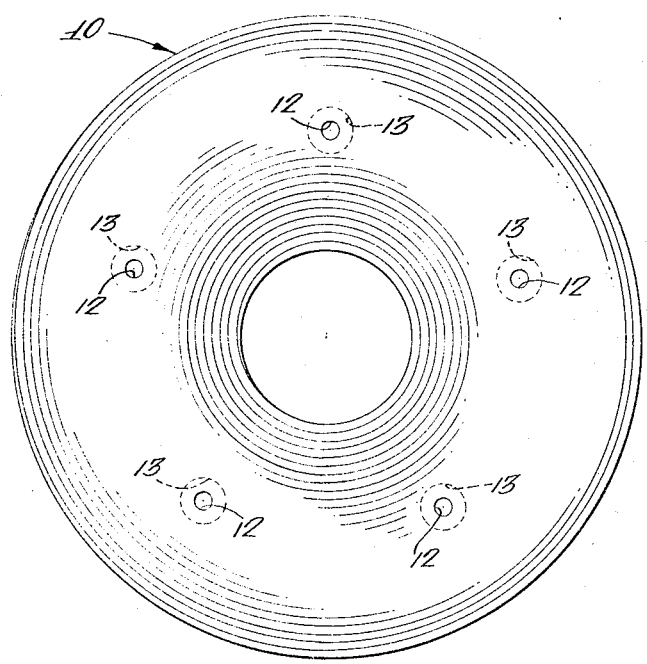
FIG. 1 is a plan view, with part broken away, of a reinforced clutch facing, in accordance with the present invention.

Referring to the drawings, the reference numeral 10 indicates an annular friction element which comprises a coiled strip of open mesh asbestos or other fabric impregnated with a cement composition comprising rubber, heat-hardenable resin binder and friction material filler. For the purpose of reinforcing the friction element 10 to obtain increased bursting strength according to this invention, there is bonded to one surface of the friction element 10, an annular reinforcing element 11 comprising a spirally wound strip of thin, flexible, consolidated and consendsed dry carded spinning grade asbestos fiber web material of relatively high porosity impregnated with a cement composition comprising heat-hardenable resin binder compatible with the cement composition of the friction element 10. The friction element 10 and the reinforcing element 11 are compressed to bond the elements together and to consolidate the convolutions of the respective elements upon each other. The elements are also heat-treated to harden or set the cement compositions of the respective elements.

Figure 2:
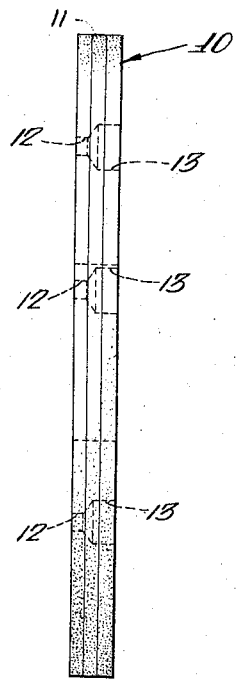
FIG. 2 is an end elevation of a clutch facing of this invention showing a preferred three-ply construction.
Figure 3:
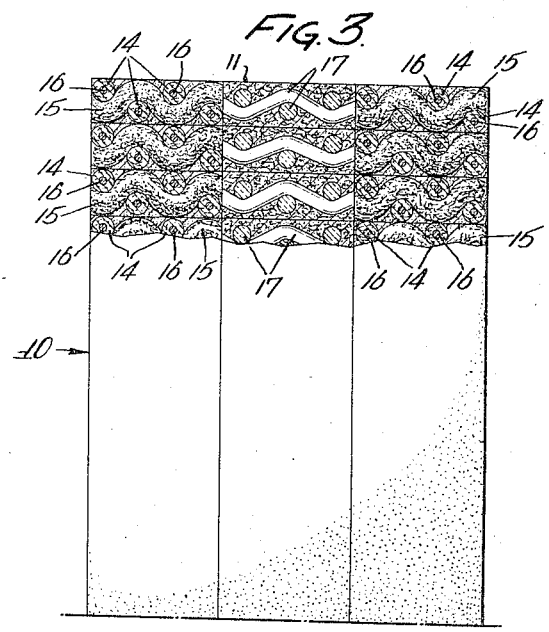
FIG. 3 is a fragmentary enlarged end elevation of the clutch facing of FIG. 2 with a part broken away to show the construction of the respective plies.

In that embodiment of the invention shown in FIGS. 2 and 3, the clutch facing comprises a pair of friction elements 10 of the type described generally above, coextensive with and bonded to opposing side surfaces of the reinforcing element 11 comprising the above generally described convolutely wound strip of dry carded spinning grade asbestos fiber web material.

The clutch facings are provided with rivet holes 12 having counterbores 13, for example by drilling, for reception of attaching rivets for securing the facings to a suitable clutch plate, not shown.

The strip of fibrous material forming the friction element 10 is preferably loosely woven of warp threads and wefts or fillers of asebestos yarn. The strip may be cut from a wider piece of asbestos cloth or fabric by winding the clutch on a mandrel and subsequently severing the cloth into a plurality of coils or strips of desired width.

In preparing the strip material for the friction element 10, the yarns can be made of asbestos fibers alone or mixed with other fibers such as cotton, wool, rayon, linen or jute. In weaving the material forming the strip, reinforcing threads or strands of any of the above fibrous materials may be used.

Figure 4:
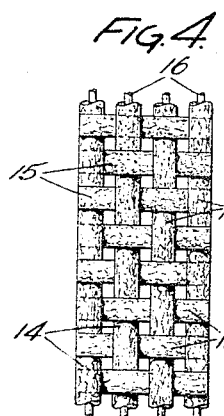
FIG. 4 is an enlarged detail of a preferred form of woven asbestos fabric which may be employed in the friction element of the clutch facings of this invention.

Preferably the yarns are of asbestos fibers, or mixtures of asbestos fibers and other fibers such as cotton fibers and are reinforced with fine metal wires of brass, copper, zinc, lead, or other metal. This preferred form of woven fabric strip material is illustrated in FIGS. 3 and 4 where the fabric comprises asbestos warp threads and asbestos weft threads 15, the former being reinforced with brass wires 16. Although only the warp threads are shown as being reinforced with wires 16, the weft threads may also be so reinforced.

A fabric particularly useful for preparing the convolute strip comprising the friction element 10 may be formed of warp and weft yarns comprising a mixture of about 75% by weight of spinning grade asbestos fibers and 25% by weight of organic fibers, such as cotton fibers, reinforced with brass wire approximately 0.008″ in diameter.

Before the woven fabric sheet is cut into convolute annuli forming the friction element 10, it is impregnated with a cement composition comprising rubber, heat-hardenable resin and friction material filler.

The rubber constituent of the cement may be either natural rubber or a synthetic rubber such as polychloroprene, butadiene-styrene copolymer, butadiene-acrylonitrile copolymer, the more recently developed hydrocarbon rubbers such as those comprising a copolymer ethylene, propylene and a third monomer such as dicyclopentadiene which provides unsaturation for curing, and the like. The cement, of course, will also include well known vulcanizing and stabilizing agents for rubber.

In addition to rubber, the cement composition with which the friction element is impregnated also contains a heat-hardenable resin which is compatible with the rubber constituent. Various heat-hardenable or thermosetting resins are suitable for such cement compositions, particularly the phenolic type, such as the phenol aldehydes, and especially phenol formaldehyde which, if desired, may be an oil modified type, as for example a para t-butyl phenol formaldehyde resin.

The cement composition for the friction element also contains a conventional friction material filler. Such fillers ordinarily will comprise inorganic materials such as litharge and barytes, or an organic filler, such as particles formed of polymerized cashew nut oil.

Typical cement compositions particularly suitable for impregnating the friction elements of the clutch facings of this invention are as follows, the proportions given being in parts by weight:

| | |
|---|---|
| Rubber (butadiene-styrene copolymer) | 5–15 |
| Rubber accelerator | .05–.5 |
| Sulfur | 1–12 |
| Barytes | 30–50 |
| Litharge | 10–40 |
| Graphite | 0.5–10 |
| Phenol formaldehyde resin | 5–15 |

Preferably, the cement composition for the friction element will contain from about 25% to about 75% rubber solids and from about 75% to about 25% of heat-hardenable resin solids, based on the combined weight of the two.

The woven fabric from which the strips comprising the friction element are made may be impregnated with cement by passing the web through a solution of the cement and removing excess by any suitable means, such as squeeze rolls. The fabric is heated to a temperature at which solvent is removed but below that required for curing the resin. The impregnated fabric preferably comprises from about 40% to about 75% of cement composition solids, based on the combined weight of fabric and cement.

The impregnated fabric may then be convolutely wound to a roll of the desired diameter and cut into coiled annuli of for example from ⅛″ to ¼″ in width, depending upon the thickness of the finished clutch facing desired. The resulting coiled annuli are then ready for assembly with the reinforcing element.

Reinforcing element 11 is formed of thin, flexible, consolidated and condensed dry carded spinning grade asbestos fiber web material. Such a web may be produced by carding a mixture of spinning grade asbestos fibers in a manner well known in the textile art. Asbestos fibers which are suitable for such use are crysotile, crocidolite or amosite. The length of the asbestos fibers employed may range from about ⅛″ to 1½″ or larger, the preferred average length being about ⅜″.

Although there is some orientation of the fibers longitudinally of the web due to the carding action, there is predominantly a random disposition of the fibers in the web, and this random disposition plays an important part in the intimate interlocking of the asbestos fibers with one another.

If desired, a plurality of these webs may be superimposed to build up the desired ultimate weight or thickness of the desired sheet, and in the practice of the present invention a laminate comprising two or more plies is preferably employed.

Figure 5:
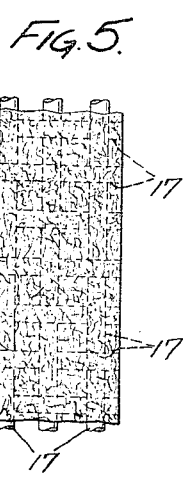
FIG. 5 is an enlarged detail of a preferred form of reinforced asbestos web material comprising the reinforcing element of the clutch facings of this invention.

Referring to FIGS. 3 and 5 of the drawings which show a preferred embodiment of the invention, the dry carded spinning grade asbestos fibers web material forming the reinforcing element 11 is reinforced by an open mesh woven glass cloth or fabric 17. Such reinforcement may be accomplished by bringing the dry carded asbestos web and the glass cloth together and passing them between a pair of rolls whereby the composite assembly is compressed, and the dry carded asbestos fibers are caused to fill the meshes of the glass cloth and to interlock with one another and with the yarns of the glass fabric. Preferably, the glass fabric has a web of dry carded asbestos fibers applied to each side of the asbestos fibers of the respective webs and yarns of the glass fabric are interlocked by passing the assembly between pressure rolls as described above. The reinforced web material ordinarily will range between about 0.010″ and 0.015″ in thickness.

The dry carded spinning grade asbestos fiber webs may be formed entirely of asbestos fibers or mixtures of asbestos fibers with a carrier fibers such as rayon, cotton, nylon, Dacron, Orlon, etc. Both natural and synthetic type carrier fibers may be used. The length of such carrier fibers may be as stated above with reference to the asbestos fibers. A particularly useful fiber mixture is one comprising 75%, by weight, of spinning grade asbestos fibers and 25% of carrier fibers such as cotton fibers.

Glass cloth formed from various sizes of glass yarns may be used for the purpose of this invention. Some examples of the yarn sizes are size 150 of which there are 15,000 yards to the pound, size 225 of which there are 22,500 yards to the pound, and size 450 of which there are 45,000 yards to the pound. A preferred glass cloth is that formed from size 150 yarn.

A glass cloth construction of 20 yarns per inch in both warp and fill is particularly satisfactory. However, glass cloth employing a greater number of yarns per inch in both warp and fill can be used, provided that there is sufficient mesh area for the asbestos fibers to interlock through the meshes of the glass cloth. Composite fabrics can be made according to this invention with various weaves of glass cloth.

The glass fabric reinforced dry carded asbestos fibers which may be used to advantage in this invention are disclosed in United States Patent No. 2,943,010 issued to E. P. Stefl et al. on June 28, 1960.

If desired the dry carded asbestos web material, whether reinforced by glass fabric or not, can be subjected to a sizing operation by immersing the material in a dilute solution of a sizing agent such as starch. The sizing operation is preferably so controlled as to incorporate from about 1% to about 2% by weight of sizing solids in the web, and to thereby leave the web in a porous condition such that it can be readily impregnated with a cement composition.

Before cutting the web into strips suitable for forming the reinforcing element 11, it is impregnated with a cement composition comprising heat-hardenable or thermosetting organic binder, such as a phenolic resin, particularly a phenol formaldehyde resin. If desired the cement composition may also contain rubber, either natural or synthetic and may have the rubber-resin composition of the friction element without the friction material filler. Preferably, the reinforcing element comprises from about 20% to about 55% of cement composition solids, based on the combined weight of such solids and web material.

The dry carded asbestos web material may be impregnated with cement composition in the same manner as described in connection with the woven fabric for use in the friction element. The dry impregnated sheet may then be wound convolutely to the desired diameter and cut into coiled annuli of the desired width, such as ⅛" to ¼" in width depending upon the desired thickness of the finish clutch facing.

A coiled annulus comprising the friction element and a coiled annulus comprising the reinforcing element are assembled together as a unit and subjected to heat and pressure by suitable means, such as, for example, in a mold to densify the facing, and cause the cement compositions of the respective elements to flow together to permeate and consolidate the windings, and to heat harden or cure the resin binder and rubber. Subsequently, the clutch facing is subjected to a finishing operation, as for example surface grinding. The rivet holes 12 may be formed during the molding operation or formed subsequently by drilling and counterboring.

According to a preferred form of the invention as illustrated in FIGS. 2 and 3, the clutch facing is formed by placing a reinforcing element between two friction elements and subjecting the three-ply laminate to heat and pressure to bond the elements together.

The thickness of the clutch facing of this invention can be varied within limits by correspondingly varying the thickness of the strips comprising the friction element(s) and reinforcing elements.

While the invention has been described with reference to specific embodiments, these have been given solely for the purpose of disclosure and are not intended to limit the invention. It will be understood, therefore, that the invention contemplates such modifications and further embodiments as may occur to those skilled in the art.

What is claimed is:

1. A clutch facing comprising an annular body formed of a friction element comprising a spirally wound fibrous fabric strip impregnated with cement composition comprising rubber, heat-hardenable resin and friction material filler, and a reinforcing element coextensive with a face of said friction element and comprising a spirally wound strip of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, and said strip comprising said reinforcing element being impregnated with a cement composition compatible with the cement composition of said friction element and comprising heat-hardenable resin, said elements being compressed to bond said elements together and to consolidate the convolutions of the respective elements upon each other and heat-treated to harden said cement compositions.

2. A clutch facing according to claim 1 in which said reinforcing element comprises from about 20% to about 55% by weight of cement composition solids.

3. A clutch facing according to claim 2 in which said friction element comprises from about 40% to about 75% of cement composition solids and said cement composition comprises from about 25% to about 75% of rubber solids and from about 75% to about 25% of heat-hardenable resin solids.

4. A clutch facing comprising an annular body formed of a pair of friction elements coextensive with and bonded to the opposing faces of a reinforcing element, each of said friction elements comprising a spirally wound fibrous fabric strip impregnated with a cement composition comprising rubber, heat-hardenable resin and friction material filler, and said reinforcing element comprising a spirally wound strip of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, and said strip comprising said reinforcing element being impregnated with a cement composition compatible with the cement composition of said friction element and comprising heat-hardenable resin, said elements being compressed to bond said elements together and to consolidate the convolutions of the respective elements upon each other and heat-treated to harden said cement compositions.

5. A clutch facing comprising an annular body formed of a friction element comprising a spirally wound strip of woven fabric having metallic wires associated with at least some of the strands thereof and impregnated with a cement composition comprising rubber, heat-hardenable resin and friction material filler, and a reinforcing element coextensive with a face of said friction element and comprising a spirally wound strip of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, and said strip comprising reinforcing element being impregnated with a cement composition compatible with the cement composition of said friction element and comprising heat-hardenable resin, said elements being compressed to bond said elements together and to consolidate the convolutions of the respective elements upon each other and heat-treated to harden said cement compositions.

6. A clutch facing according to claim 5 in which said reinforcing element comprises from about 20% to about 55% by weight of cement composition solids.

7. A clutch facing according to claim 6, in which said friction elements comprise from about 40% to about 75% of cement composition solids and said cement composition comprises from about 25% to about 75% of rubber solids and from about 75% to about 25% of heat-hardenable resin solids.

8. A clutch facing comprising an annular body formed of a pair of friction elements coextensive with and bonded to the opposing faces of a reinforcing element, each of said friction elements comprising a spirally wound strip of woven fabric having metallic wires associated with at least some of the strands thereof and impregnated with a cement composition comprising rubber, heat-hardenable resin and friction material filler, and said reinforcing element comprising a spirally wound strip of thin, flexible, consolidated and condensed dry carded spinning grade asbestos fiber web material of relatively high porosity reinforced by an open mesh woven glass fabric, the fibers being interlocked with each other and with the yarns of said glass fabric and filling the meshes thereof, and said strip comprising said reinforcing element being impregnated with a cement composition compatible with the cement composition of said friction element and comprising heat-hardenable resin, said elements being compressed to bond said elements together and to consolidate the convolutions of the respective elements upon each other and heat-treated to harden said cement compositions.

9. A clutch facing according to claim 8 in which said reinforcing element comprises from about 20% to about 55% by weight of cement composition solids.

10. A clutch facing according to claim 9 in which said friction elements comprise from about 40% to about 75% of cement composition solids, and said cement composition comprises from about 25% to about 75% of rubber solids and from about 75% to about 25% of heat-hardenable resin solids.

References Cited

UNITED STATES PATENTS

| | | | |
|---|---|---|---|
| 2,096,692 | 10/1937 | Cilley | 192—107 |
| 2,546,056 | 3/1951 | Batchelor | 192—107 X |
| 2,640,795 | 6/1953 | Bertolet | 192—107 X |
| 2,702,770 | 2/1955 | Steck | 192—107 X |
| 2,855,081 | 10/1958 | Morton | 192—107 X |
| 3,068,131 | 12/1962 | Morton | 192—107 X |

BENJAMIN W. WYCHE III, *Primary Examiner.*